UNITED STATES PATENT OFFICE.

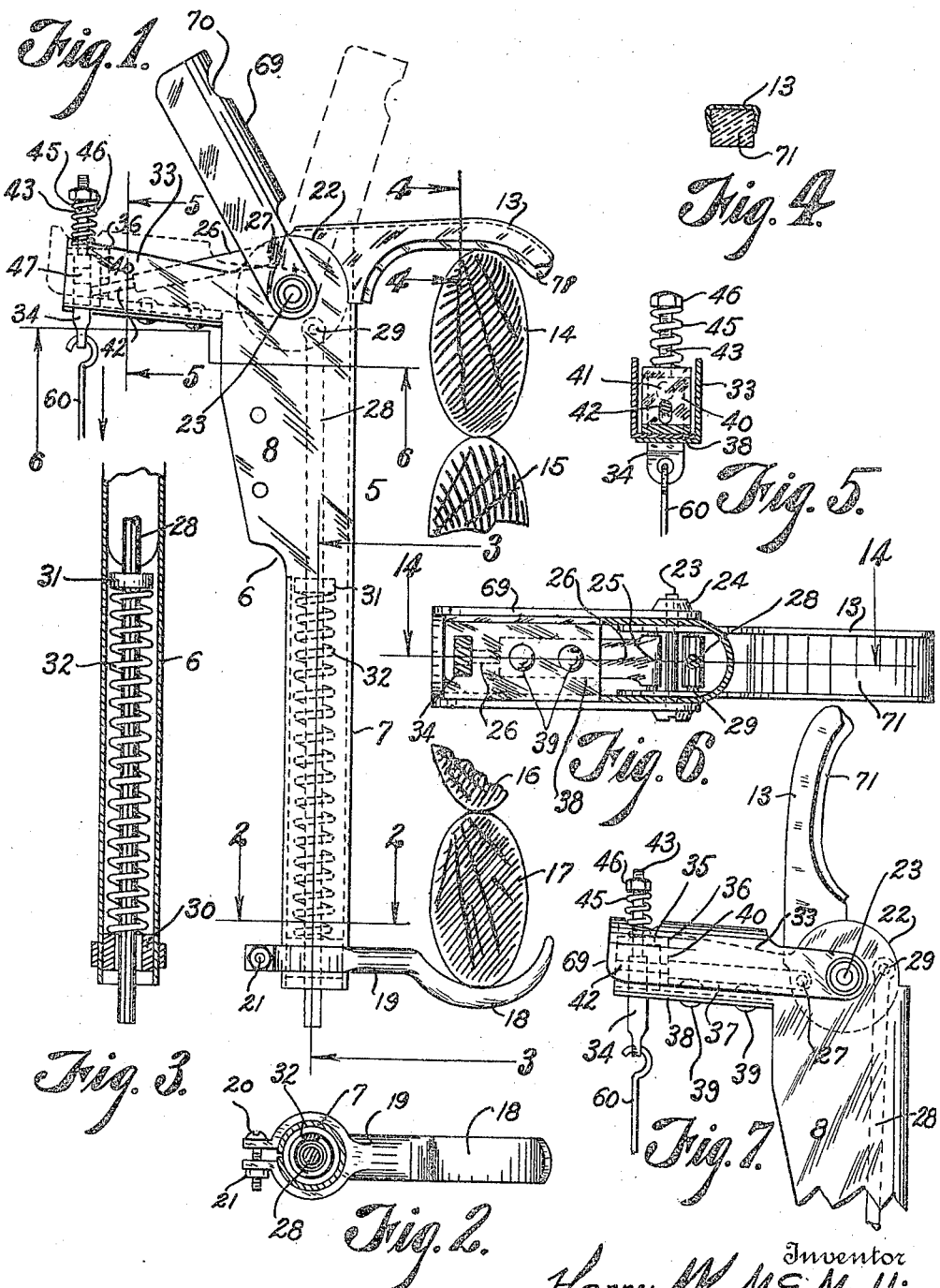

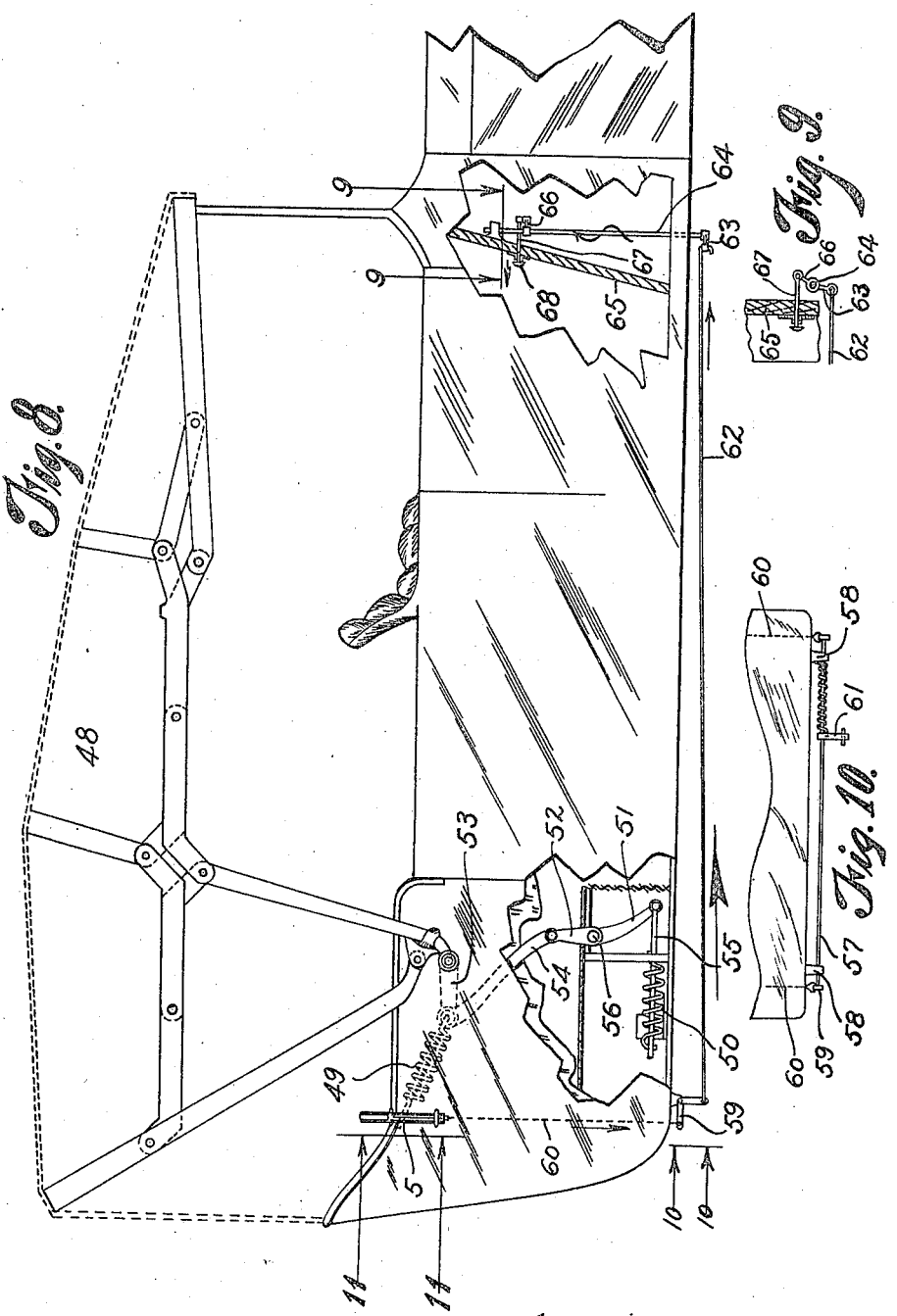

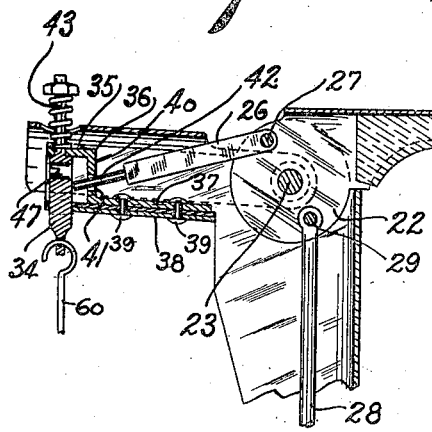
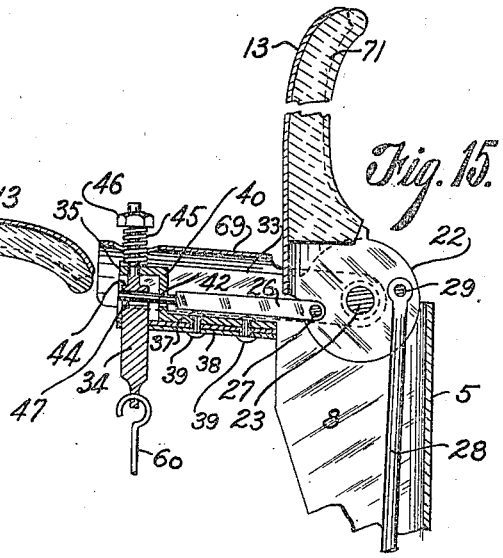
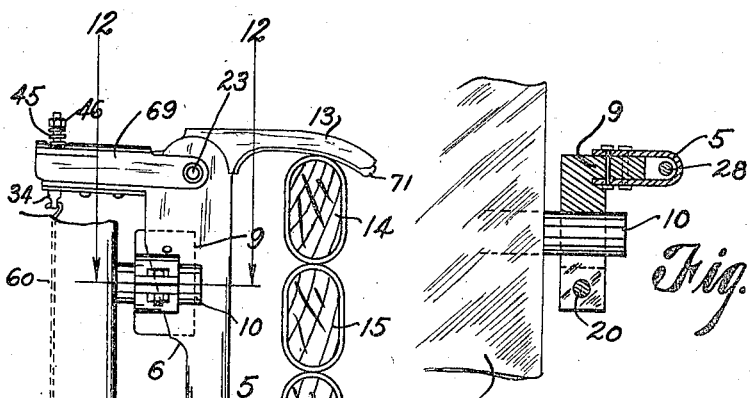
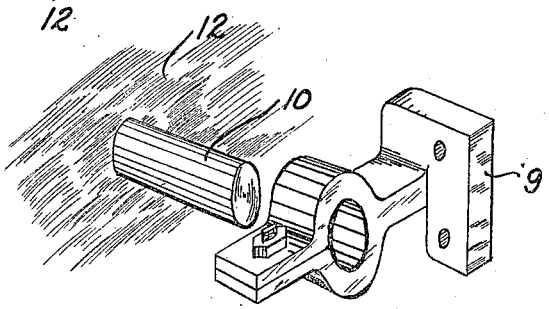

HARRY W. McMULLIN, OF DENVER, COLORADO, ASSIGNOR TO THE McMULLIN AUTOMATIC TOP COMPANY, OF DENVER, COLORADO.

LOCK FOR AUTOMOBILE-TOPS.

1,320,333. Specification of Letters Patent. Patented Oct. 28, 1919.

Application filed June 25, 1918. Serial No. 241,870.

*To all whom it may concern:*

Be it known that I, HARRY W. McMULLIN, a citizen of the United States, residing at the city and county of Denver and State of Colorado, have invented certain new and useful Improvements in Locks for Automobile-Tops; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in means for locking automobile tops in the down position, being more especially intended as a device for securing automobile tops in such position, which are spring actuated or under tension to open automatically when released. This lock is readily releasable by the person in charge of the car from his position in the front seat. I prefer to employ one of these locks on each side of the car and so positioned that the movable locking member engages the uppermost bow when the top is collapsed. The locking device may be secured to the body of the machine in any suitable manner.

Having briefly outlined my improvement I will proceed to describe the same in detail reference being made to the accompanying drawing in which is illustrated an embodiment thereof. In this drawing:

Figure 1 is a side elevation of my improved lock shown in connection with the bows of an automobile top on one side of the machine.

Fig. 2 is a section taken on the line 2—2, Fig. 1.

Figs. 3, 4, 5 and 6 are sections taken on the lines 3—3, 4—4, 5—5 and 6—6 respectively of Fig. 1.

Fig. 7 is a fragmentary side elevation of the lock mechanism showing the parts in the unlocked position.

Fig. 8 is a side elevation of an automobile body showing my improved device in place.

Fig. 9 is a section taken on the line 9—9, Fig. 8.

Fig. 10 is a fragmentary rear elevation of the lower back part of the body of an automobile equipped with my improvement looking in the direction of arrows 10, Fig. 8.

Fig. 11 is a view illustrating the manner of attaching my improved device to an automobile, being a view similar to Fig. 1, but on a smaller scale.

Fig. 12 is a section taken on the line 12—12, Fig. 11.

Fig. 13 is a perspective view of a bracket for holding my improved lock.

Fig. 14 is a central vertical section taken through my improved lock mechanism shown in the locking position, the lower portion of the frame being broken away.

Fig. 15 is a similar view showing the mechanism in the unlocked position.

The same reference characters indicate the same parts in all the views.

Let the numeral 5 designate my improved lock considered in its entirety and comprising a vertically disposed frame 6 which is formed hollow, its lower part 7 being tubular and its upper part 8 open at the side to receive a lug formed on a clamping bracket 9, the latter being secured to a pin or projection 10 with which the automobile body 12 is equipped. This bracket is clamped to the part 10 by a fastening device 12 preferably consisting of a bolt and nut.

To the upper portion of the part 8 of the frame is pivotally connected an arm 13 which is adapted to engage the uppermost bow 14 of the automobile top, when the latter is in the collapsed position, the other bows of the top being designated by the numerals 15, 16 and 17, the lowermost bow engaging the curved part 18 of a device 19, the latter being clamped to the lower end of a tubular part 7 of the frame by means of a screw or bolt 20 to which a nut 21 is applied.

When the automobile top is lowered so that the bows are in the position shown in Figs. 1 and 11, the arm 13 is in the unlocked or upright position indicated in Fig. 7.

This arm 13, as shown in the drawing is formed of sheet metal, its portion connected with the upper portion of the part 8 being circular in shape as shown at 22, this part being connected with the top of the frame by a pivot bolt 23 to which a nut 24 is applied. The circular part 22 of the arm 13 is bifurcated to receive the extremity 25 of a locking pin 26 which is pivotally connected with the circular part 22, as shown at 27, while a rod 28 is pivotally connected with the same part, as shown at 29. This rod 28 is vertically disposed and extends downwardly through the parts 7 and 8 of the frame, its lower extremity passing through a stop collar 30 secured in the lower portion of the tubular part 7. This rod is also provided at a suitable distance above the stop collar 30 with a similar collar 31. Between these two collars is located a spiral spring 32.

The stop pin 26 is housed within a projection 33 formed on the upper part 8 of the frame and extending inwardly from the location of the bows when the later are in the collapsed position, as shown in Figs. 1 and 11.

This part 33 of the frame is open at the top, being hollow the same as the entire frame member. Near its free extremity is located a vertically disposed keeper 34 which passes through the top part 35 of a Z-shaped plate 36, one arm 37 of the plate being secured to the bottom portion 38 of the casing part 33 by means of fastening devices as rivets 39. The upright part 40 of the Z-shaped plate is provided with a perforation 41 adapted to receive the reduced part 42 of the locking pin 26. The keeper 34 passes through an opening in the lower part 38 of the member 33 and is freely movable therein. The upper part of the keeper consists of a reduced stem 43 which passes through an opening in the part 35 of the Z-shaped plate 36, the said part 35 being engaged from below by a shoulder 44 between the stem 43 and the body of the keeper. The stem 43 is surrounded by a spiral spring 45 whose upper extremity engages a tension nut 46 threaded on the stem and adjustable to regulate the tension of the spring whose lower extremity engages the part 35 of the Z-shaped plate. This spring is inwardly under tension to hold the keeper in the position shown in Fig. 14. The keeper is further provided with an opening 47 adapted to receive the part 42 of the locking pin when the arm 13 is in the unlocked position or that shown in Figs. 7 and 15. This condition is brought about by moving the keeper downwardly against the tension of its spring until the opening 47 is in alinement with the part 42 of the locking pin, in which event the arm 13 will be raised to unlock the collapsed top of the machine since the rod 28 is under tension to impart such movement to the said arm, the result being that the locking pin is thrust toward the left, referring to Figs. 14 and 15, and through the opening 47, thus maintaining the keeper in the down position with its spring considerably compressed, all of the parts of the lock structure being then in the position best illustrated in Fig. 15. Again, as soon as the arm 13 is manually moved to the locking position or that shown in Figs. 1 and 14, the keeper is automatically raised by the recoil of its spring so that its opening 47 is out of alinement with the part 42 of the locking pin and forms an abutment to lock the arm 13 in the said position until the keeper is again moved downwardly for the purpose of releasing the lock mechanism.

The manner of employing this lock in connection with an automobile top is illustrated in Fig. 8 in which the top 48 is under stress to occupy the raised position under the influence of springs 49 and 50 which act through the medium of crank arms 51, 52 and 53, a link 54 and a rod 55. When the top is in the closed or collapsed position, the spring 50 is compressed and the spring 49 stretched, both springs being, therefore, under tension to raise the top to the position shown in Fig. 8. It should be understood that there is a pair of springs 49 and 50 as well as the other parts with which they cooperate on each side of the machine. The crank arms 51 and 52 are fast on a rock shaft 56. Below the rear portion of the machine is arranged a rock spindle 57 which is journaled in hangers 58. Two crank arms 59 are connected with this spindle and also with the lower extremities of the keepers 35 by rods 60 whose upper extremities are hooked into openings formed in the lower extremities of the keepers. The rock spindle 57 is further provided with a crank arm 61 which is connected by means of a relatively long rod 62 with a crank arm 63 secured to the lower extremity of a vertically disposed spindle 64 which is journaled in the body of the machine just forward of the dashboard 65, the upper portion of the spindle having a crank arm 66 which is connected with a pull rod 67, one extremity of which projects rearwardly through the dashboard, as shown at 68, where it is accessible to the person in charge of the machine.

Now, assuming that the top is in the down position and it is desired to release it, the chauffeur will pull inwardly upon the extremity 68 of the rod 67 which will impart a partial rotary movment to the spindle 64 and in part a forward movement to the rod 62, which will actuate the rock spindle 57 to move the keepers 34 downwardly to the position best illustrated in Fig. 15, in which event the arms 13 will be automatically thrown to the unlocked position, or that shown in Fig. 15 through the instrumentality of the springs 32 mounted upon the rods 28, as heretofore explained.

In order to close the upper open extremity of the casing part 33 I provide a housing member 69 which is pivotally connected with the opposite extremities of the pivot bolt 23 and is freely movable on said bolt so that it may be employed for housing the part 33 or locking the arm 13 in the locked position, as may be desired. This housing member is provided with an opening 70 to receive the upper part 43 of the keeper, the opening being large enough to allow the tension nut to pass therethrough or occupy the position shown in Figs. 7, 14 and 15. When it is desired to lock the arm 13 in such position that the keepers 34 cannot be moved downwardly in order to release the lock, the housing member is thrown to the position shown by dotted lines in Fig. 1 thus forming a positive lock to prevent the releasing of the arms 13.

Having thus described my invention what I claim is:

1. In a lock for vehicle tops, the combination with a frame, of an arm pivotally connected with the frame and under stress to move to the unlocked position, a pin movable with the arm, and a spring-actuated keeper normally engaging the pin to prevent the movement of the arm when in the locking position but movable against the tension of its spring to release the arm.

2. In a lock of the class described, the combination with a frame, of an arm pivotally connected with the frame to move into the locked and unlocked position, a spring connected in operative relation with the arm and under tension to move the latter into the unlocked position, a pin movable with the arm, and an abutment normally spring-retained in position to engage the locking pin and maintain the arm in the locking position, the abutment being movable against the tension of its spring for releasing purposes.

3. The combination with a frame, of an arm pivotally mounted on the frame, a spring-actuated rod connected with the arm and under tension to throw the arm and to maintain it in the unlocked position, a pin also connected with the arm, and a spring-actuated keeper normally engaging the pin to hold the arm in the unlocked position against the strain exerted by the rod but movable against the tension of its spring for releasing purposes.

4. In a lock for vehicle tops, the combination with a support, of an arm pivoted on the support and provided with a circular part extending beyond and around its axis, a spring-actuated rod pivotally connected with said circular part, a pin also pivotally connected at one extremity with the circular part of the arm, a spring-actuated keeper normally engaging the opposite extremity of said pin, the keeper having an opening and being movable to allow the pin to enter said opening.

5. A lock of the class described comprising a support, a pivoted arm having a disk extending around the pivotal axis, a spring-actuated rod connected with the disk, a pin also connected with the disk, and a spring-actuated keeper normally forming an abutment engaging the pin to lock the arm against movement, the keeper having an opening for the pin and being movable to allow the pin to enter said opening to release the arm.

6. A lock of the class described comprising a support, a pivoted arm, a spring-actuated rod connected with the arm, a pin also connected with the arm, a stationary guide for the pin, a keeper adjacent the guide and normally forming an abutment for the pin, the keeper being movable in the support to release the pin.

7. A lock of the class described comprising a support a pivoted arm, a spring-actuated rod connected with the arm, a pin pivotally connected with the arm at one extremity, a stationary guide for the pin, a keeper adjacent the guide and normally engaging the pin to hold the arm against movement, the keeper being movable to release the arm, and means for actuating the keeper to release the pin and the arm controlled thereby.

8. A lock of the class described comprising a support, a pivoted arm, a spring-actuated rod connected with the arm, a keeper normally forming an abutment to lock the arm against movement, and being movable to release the arm, and a pivoted member movable to house the locking pin structure and also adapted to engage the pivoted arm in locking relation.

9. A lock of the class described comprising a support, a pivoted arm, a spring-actuated rod connected with the arm, a pin also connected with the arm, a keeper normally forming a stop engaging the pin to prevent the movement of the arm, the keeper being movable to release the arm, and means pivotally mounted on the support and adapted to engage the arm when in the locking position to prevent its release.

In testimony whereof I affix my signature.

HARRY W. McMULLIN.